(12) United States Patent
Crawford et al.

(10) Patent No.: US 10,942,045 B1
(45) Date of Patent: Mar. 9, 2021

(54) PORTABLE SENSOR CALIBRATION TARGET FOR AUTONOMOUS VEHICLE

(71) Applicant: Waymo LLC, Mountain View, CA (US)

(72) Inventors: Andrew Crawford, San Francisco, CA (US); Rikard Grunnan, Tiburon, CA (US)

(73) Assignee: Waymo LLC, Mountain View, CA (US)

( * ) Notice: Subject to any disclaimer, the term of this patent is extended or adjusted under 35 U.S.C. 154(b) by 263 days.

(21) Appl. No.: 15/944,087

(22) Filed: Apr. 3, 2018

(51) Int. Cl.
| | |
|---|---|
| *G01D 11/30* | (2006.01) |
| *G01S 17/86* | (2020.01) |
| *G01S 7/40* | (2006.01) |
| *G01S 17/931* | (2020.01) |

(52) U.S. Cl.
CPC ............ *G01D 11/30* (2013.01); *G01S 7/40* (2013.01); *G01S 17/86* (2020.01); *G01S 17/931* (2020.01)

(58) Field of Classification Search
CPC ...... G01D 11/30; G01S 17/023; G01S 17/936
See application file for complete search history.

(56) References Cited

U.S. PATENT DOCUMENTS

| | | | | |
|---|---|---|---|---|
| 5,145,133 A * | 9/1992 | France | ................. | F41J 1/10 248/168 |
| 5,950,979 A * | 9/1999 | Mira | ................. | A47B 97/08 248/449 |
| 7,121,011 B2 * | 10/2006 | Murray | ............... | G01B 11/2755 33/288 |
| 7,501,980 B2 * | 3/2009 | Focke | ................. | G01S 13/867 342/174 |
| 9,279,670 B2 * | 3/2016 | Schommer | ........ | G01S 7/52004 |
| 9,644,782 B2 * | 5/2017 | Linson | ............... | F16M 11/42 |
| 10,323,936 B2 * | 6/2019 | Leikert | ............. | G01B 11/2755 |

(Continued)

FOREIGN PATENT DOCUMENTS

| | | | |
|---|---|---|---|
| DE | 102016008689 A1 * | 2/2017 | |
| WO | WO-2017016541 A1 * | 2/2017 | ............ G01S 13/931 |
| WO | WO-2018154328 A1 * | 8/2018 | ......... G09F 15/0062 |

OTHER PUBLICATIONS

Sungdae Sim et al., "Indirect Correspondence-Based Robust Extrinsic Calibration of LiDAR and Camera", Sensors, Jun. 22, 2016. (Year: 2016).*

(Continued)

*Primary Examiner* — David A. Rogers
(74) *Attorney, Agent, or Firm* — Botos Churchill IP Law

(57) ABSTRACT

A portable sensor calibration target includes a frame assembly, a first panel, and a second panel. The frame assembly may include three legs and a plurality of frame edges that is configured to form a first frame and a second frame and is configured to be held at a pre-selected height above ground by the legs. The first panel is removably attached to the first frame in an unfolded position, and includes a plurality of boards and a plurality of hinges connecting the plurality of boards. The first panel is configured to fold at the plurality of hinges into a folded position. The second panel is removably attached to the second frame adjacent to the first frame. The first panel and the second panel meet to form an edge, which is detectable by a detection system of a vehicle for calibrating the detection system.

20 Claims, 15 Drawing Sheets

(56) References Cited

U.S. PATENT DOCUMENTS

| | | | | |
|---|---|---|---|---|
| 2004/0049930 A1* | 3/2004 | Murray | ............... | G01S 7/4972 |
| | | | | 33/288 |
| 2005/0096807 A1* | 5/2005 | Murray | ............... | G01S 7/4026 |
| | | | | 33/288 |
| 2007/0045965 A1* | 3/2007 | Bateman | ................... | F41J 1/10 |
| | | | | 273/407 |
| 2013/0325252 A1* | 12/2013 | Schommer | ......... | G01S 7/52004 |
| | | | | 701/33.1 |
| 2018/0075675 A1* | 3/2018 | Kim | ................... | H04N 5/23216 |
| 2018/0284222 A1* | 10/2018 | Garrec | .................. | H01Q 21/28 |
| 2019/0104295 A1* | 4/2019 | Wendel | ............... | H04N 13/282 |
| 2019/0187249 A1* | 6/2019 | Harmer | ............... | F16M 11/242 |
| 2019/0204425 A1* | 7/2019 | Abari | ................... | G01S 17/931 |
| 2019/0249985 A1* | 8/2019 | Stieff | ................ | G01B 11/2755 |
| 2019/0331482 A1* | 10/2019 | Lawrence | ............ | G01S 7/4026 |
| 2019/0392610 A1* | 12/2019 | Cantadori | ............ | G01S 17/931 |

OTHER PUBLICATIONS

Art Display Grid, V-Shaped, available on the internet at <https://www.displays2go.com/P-32113/2-Panel-Art-Show-Display-Bases-Included. (Year: 2017).*

* cited by examiner

106

PORTABLE SENSOR CALIBRATION TARGET FOR AUTONOMOUS VEHICLE

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using cameras, radar, sensors, and other similar devices. The perception system executes numerous decisions while the autonomous vehicle is in motion, such as speeding up, slowing down, stopping, turning, etc. The perception system may include a plurality of detection systems, such as cameras, sensors, and global positioning devices, which gathers and interprets images and sensor data about its surrounding environment, e.g., parked cars, trees, buildings, etc.

BRIEF SUMMARY

Aspects of the disclosure provide for a portable sensor calibration target. The portable sensor calibration target includes a frame assembly, a first panel, and a second panel. The frame assembly includes three legs, and a plurality of frame edges configured to form a first frame and a second frame adjacent the first frame and configured to be held at a pre-selected height above ground by the three legs. The first panel is a first panel removably attached to the first frame in an unfolded position. In addition, the first panel includes a plurality of boards, and a plurality of hinges connecting pairs of the plurality of boards. The first panel is configured to fold at the plurality of hinges into a folded position when not attached to the first frame. The second panel is removably attached to the second frame adjacent to the first frame, and the first panel and the second panel meet to form an edge. The edge is detectable by a detection system of a vehicle for calibrating the detection system.

In one example, the second panel is removably attached to the second frame in an unfolded position, and the second panel includes a second plurality of boards and a second plurality of hinges connecting pairs of the second plurality of boards. In this example, the first panel is configured to fold at the second plurality of hinges into a folded position when not attached to the second panel. The first frame, the second frame, the first panel, and the second panel are optionally each rectangular. The plurality of boards is also optionally rectangular.

Additionally or alternatively, the plurality of frame edges also include joint portions, a first joint portion of a first frame edge of the plurality of frame edges being configured to removably connect with a second joint portion of a second frame edge of the plurality of frame edges. In this example, the first frame edge and the second frame edge form a right angle when the first joint portion and the second joint portion are connected. In another example, the three legs are configured to removably connect with the first frame and the second frame using adjustable stops on a subset of the plurality of frame edges. In some implementations, the folded position of the first panel is when the first panel folded in half twice from the unfolded position. The first panel is also optionally removably attached to the first frame using a hook and loop fastener.

Yet another example of the system also includes an intensity calibration fabric removably attached to the first panel. The intensity calibration fabric of this example is optionally rectangular and has same dimensions as the first panel. Additionally or alternatively, the intensity calibration fabric is removably attached to the first panel using a hook and loop fastener. The first panel, in a further example, is four feet by four feet. In yet another example, the plurality of hinges are fiberglass tape hinges configured to limit or mitigate laser resolution interference.

Another aspect of the disclosure provides for a method. The method includes assembling a frame assembly by removably connecting a plurality of frame edges to form a first frame and a second frame configured to stand on three legs at a pre-selected height; moving a first panel from a folded position to an unfolded position, the first panel comprising a plurality of board connected by a plurality of hinges, the plurality of boards being stacked in the folded position and unstacked in the unfolded position; attaching the first panel to the first frame; and attaching a second panel to the second frame to meet and form an edge with the first panel, the edge being detectable by a detection system of a vehicle for calibrating the detection system.

In one example, assembling the frame assembly includes connecting a first joint portion of a first frame edge of the plurality of frame edges to a second joint portion of a second frame edge of the plurality of frame edges. Additionally or alternatively, assembling the frame assembly includes connecting a given leg of the three legs to a given frame edge of the plurality of frame edges using an adjustable stop on the given frame edge. Attaching the first panel to the first frame optionally includes connecting a first fastener portion of the first panel to a corresponding second fastener portion of the first frame.

In another example, the method also includes attaching an intensity calibration fabric to the first panel. In yet another example, the method also includes moving the second panel from a folded position to an unfolded position. The second panel in this example includes a second plurality of board connected by a second plurality of hinges, where the second plurality of boards is stacked in the folded position and unstacked in the unfolded position.

Further aspects of the disclosure provide for a non-transitory, tangible computer-readable storage medium on which computer readable instructions of a program are stored. The instructions, when executed by one or more computing devices, cause the one or more computing devices to perform the method described above.

DETAILED DESCRIPTION

Overview

The technology relates to a portable sensor calibration target for a plurality of detection systems in a vehicle. The portable sensor calibration target may include two or more panels, a frame assembly, and an intensity calibration fabric. In order to increase the portability ease of transport and shipping of the portable sensor calibration target, the two or more panels may be foldable or otherwise reduced in size and the frame assembly may be retractable, collapsible, disassembled, or otherwise reduced in size. The intensity calibration fabric may also be reducible in size, such as by folding or rolling the intensity calibration fabric.

When assembled, the portable sensor calibration target may be used to calibrate the plurality of detection systems. The plurality of detection systems may include at least two detection systems. A first detection system of the plurality of detection systems may be one or more lidar systems configured to detect objects within a first range of distances from the vehicle and below a first height. A second detection system of the plurality of detection systems may be one or more lidar systems configured to detect objects within a narrow angle view and within a second range of distances from the vehicle that includes larger distances than the first range. In some implementations, the plurality of detection systems that the portable sensor calibration target may be used to calibrate includes a third detection system that includes one or more lidar systems configured to detect objects within a wide angle view larger than the narrow angle view and within a third range of distances including shorter distances than the first range.

The features described herein may be used to more quickly respond to sensor calibration needs in autonomous or semi-autonomous vehicles. The portability of the target allows for calibration to be performed in any location where the target may be properly assembled and/or configured. For instance vehicle would not be required to travel to a specific calibration location, which may be located far from the vehicle. The vehicle may therefore be able to perform more client tasks with the resources that are saved from having to make a trip to the specific calibration location. With a reduced need for specific calibration locations comes a reduced overall cost of operating and maintaining specific calibration locations.

Example Systems

Figure 1:
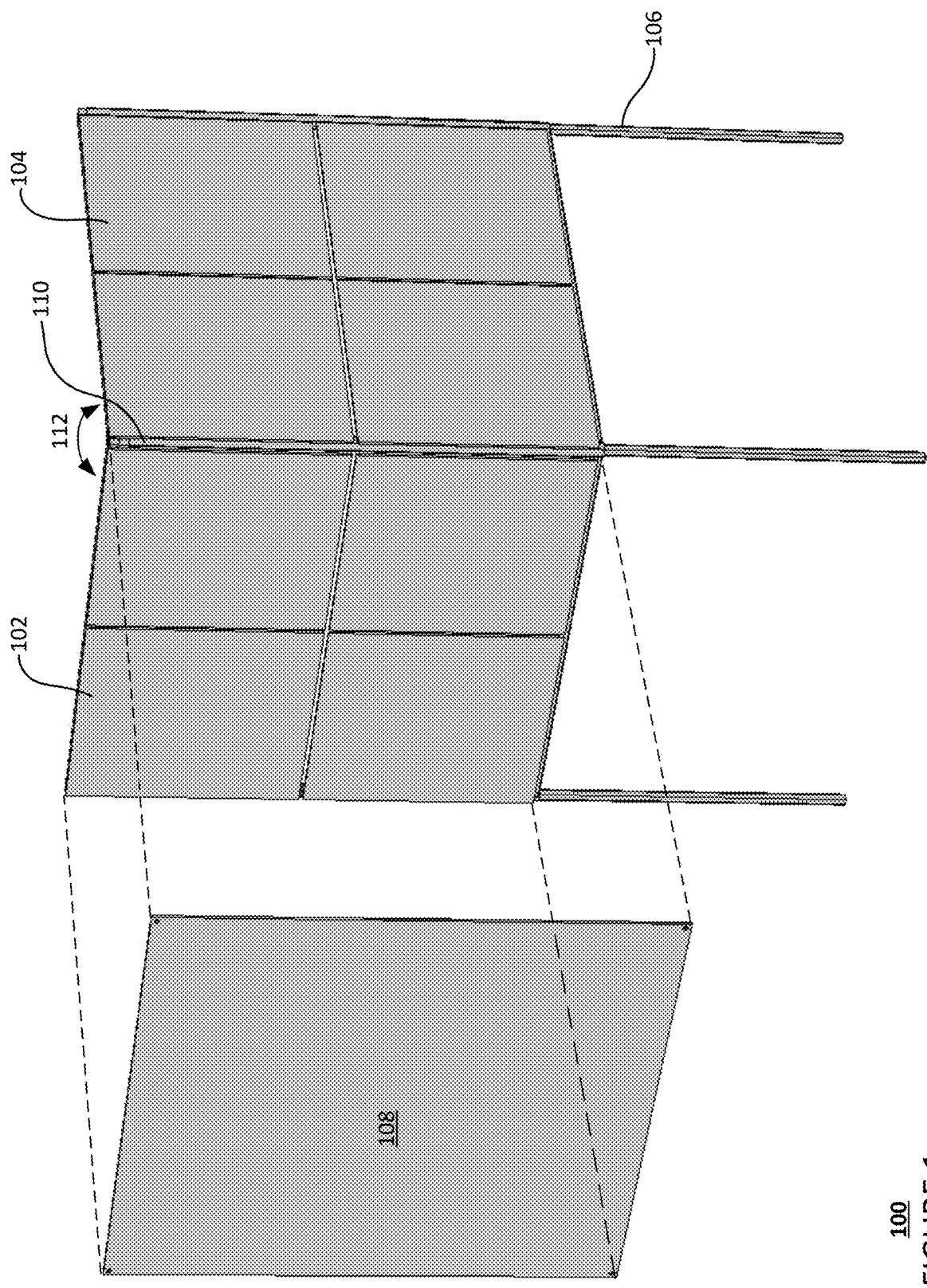
FIG. 1 is a perspective view of a sensor calibration target in accordance with aspects of the disclosure.

As shown in FIG. 1, a portable sensor calibration target 100 may include two or more panels 102, 104, a frame assembly 106, and an intensity calibration fabric 108. When assembled, panels 102 and 104 may be positioned vertically to the ground and may be joined at an edge 110 to form a right angle 112, or a 90 degree angle, or more or less. The edge 110 may be more or less vertical to the ground. The frame assembly 106 may be configured to hold the panels 102 and 104 vertically at a pre-selected height off the ground. The pre-selected height may be determined based on a location of a detection system on a vehicle and/or a height of the vehicle. In particular, the pre-selected height may allow the panels 102 and 104 to be detectable by the detection system of the vehicle, such as at a same or similar height as the detection system. The intensity calibration fabric 108 may be configured to be attached to the frame assembly or one of the panels in order to cover one of the panels. The portable sensor calibration target 100 may be assembled without the intensity calibration fabric 108 to calibrate a first detection system and/or a second detection system of a vehicle. When the intensity calibration fabric 108 is attached on the frame over the panel 102, a third detection system of the vehicle may also be calibrated.

Figure 2:
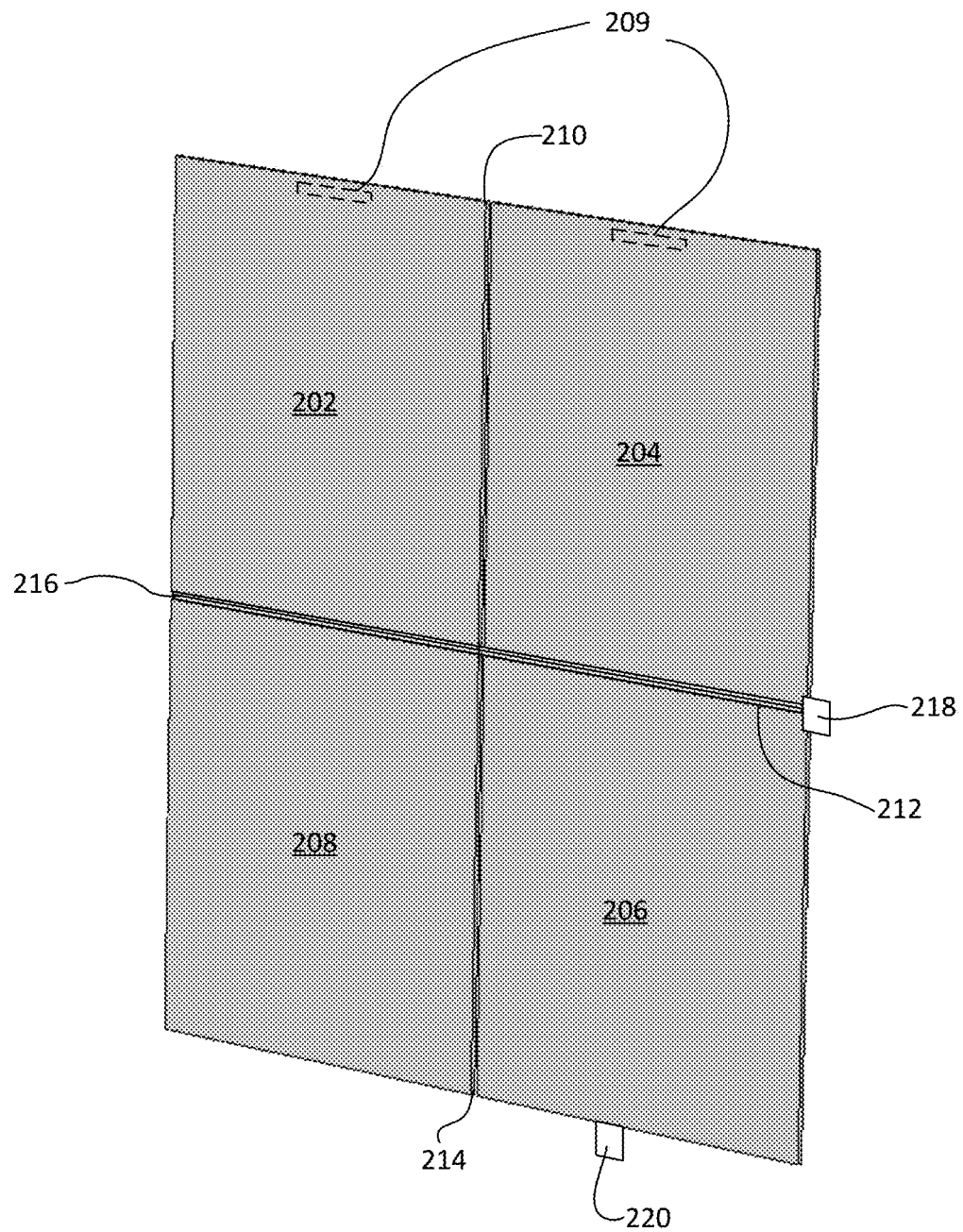
FIG. 2 is a perspective view of a panel in accordance with aspects of the disclosure.

Each of the two or more panels 102, 104 may be formed of a plurality of boards that are square or rectangular. For example, as shown in FIG. 2, the panel 102 may include boards 202, 204, 206, and 208. Boards 202, 204, 206, and 208 are each two feet by two feet, and may be assembled in a coplanar two by two grid, forming a four feet by four feet square panel. In FIG. 2, board 202 is positioned next to board 204 along a lengthwise edge. Boards 202 and 204 are aligned such that the lengthwise edge of board 202 matches the lengthwise edge of board 204. Board 202 is also positioned next to board 208 along a widthwise edge that is adjacent to the lengthwise edge. Boards 202 and 208 are aligned such that the widthwise edge of board 202 matches the widthwise edge of board 208. Board 206 is positioned next to boards 204 and 208 with a widthwise edge of board 206 aligned with a widthwise edge of board 204 and a lengthwise edge of board 206 aligned with a lengthwise edge of board 208. Board 206 may therefore be arranged diagonally with respect to board 202. Panel 104 may be configured in the same way as panel 102.

Other dimensions and arrangements may be utilized for the plurality of boards to form panels of different sizes. For example, in another implementation, the plurality of boards may include two boards that are each two feet by four feet. The two boards may be assembled with a four-foot edge of a first board is aligned with a four-foot edge of a second board to form a panel that is four feet by four feet.

The plurality of boards may be formed from aluminum polycarbonate. Aluminum polycarbonate is a lightweight material that is easily detected by lidar. In other implementations, the plurality of boards may be formed from thermoplastic polypropylene, which is lighter than aluminum. Alternatively, one or more other materials that are detectable by lidar may be used in place of or in combination with aluminum polycarbonate or thermoplastic polypropylene.

One or more of the plurality of boards may include a first attachment means configured to removably attach to a corresponding portion of the frame assembly. For example, boards 202 and 204 may include a fastener portion 209 configured to attach to a corresponding fastener portion on frame assembly 106. The fastener portion may be a hook and loop fastener, a magnet, a snap, a hook, or any other known fastener configured to removably attach to a corresponding fastener portion of the frame assembly. As shown in FIG. 2, the fastener portion 209 may be positioned at the back of the board 202 or 204. Alternatively, the fastener portion may include one or more apertures configured to receive a screw, peg, or other feature of the frame assembly 106. In a further alternative, the fastener portion may include a clamp, clip, ties, temporary adhesive or other known attachment devices configured to temporarily attach the panel 102 to frame assembly 106.

The boards may be attached to one another using fiberglass tape hinges 210, 212, 214, and 216. Hinge 210 is between boards 202 and 204; hinge 212 between boards 204 and 206; hinge 214 between boards 206 and 208; and hinge 216 between boards 208 and 202. Hinges 210 and 214 are configured to fold along the same axis, and hinges 212 and 216 are configured to fold along the same axis. The fiberglass tape hinges may limit or mitigate laser resolution interference that would be caused by metal hinges or gaps between the boards. In addition, the fiberglass tape hinges may allow the plurality of boards to form a panel having flatter surface than other types of hinges. Other forms of attachment that limit or mitigate laser resolution interference may alternatively be used.

In some examples, the panel 102 or 104 may include a plurality of tabs positioned on one or more edges of the panel. For example, as shown in FIG. 2, tab 218 may be positioned along an edge of the panel 102 formed by boards 204 and 208 and may be positioned at or near hinge 212. Tab 220 may be positioned along an edge of the panel 102 formed by boards 206 and 208 and may be positioned on a width edge of board 206. The plurality of tabs may be configured and positioned to facilitate the folding and unfolding of the panel 102 as further described below.

Figure 3:
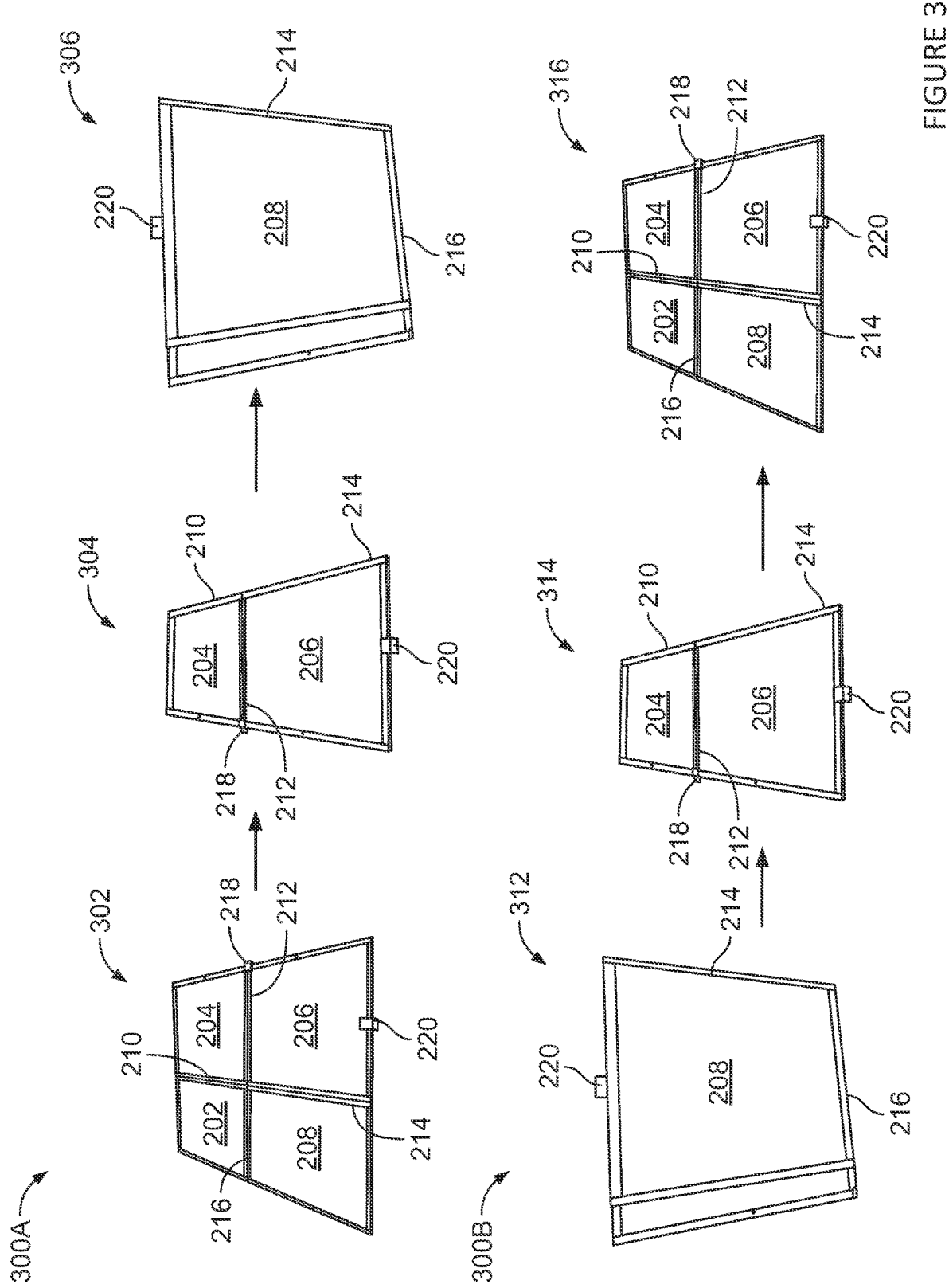
FIG. 3 are example flows in accordance with aspects of the disclosure.

The panel 102 or 104 may be configured to fold into a smaller shape, as shown in flow 300A of FIG. 3. At step 302, the panel 102 is shown laid flat on a surface and configured as described above in FIG. 2. The fronts of boards 202, 204, 206, and 208 are shown, while the backs of the boards opposite the fronts are facing the surface on which the panel 102 is laid, and are not shown. At step 304, the panel 102 is folded along hinges 210 and 214, such that the edge formed by boards 204 and 206 meets the edge formed by boards 202 and 208.

In the configuration in step 304, the backs of boards 204 and 206 are shown, while the fronts of boards 204 and 206 are in contact with the fronts of boards 202 and 208, respectively. The tab 218 is configured such that, when grasped and moved towards the edge formed by boards 202 and 208 (a motion similar to flipping a page of a book), both boards 204 and 206 are rotated about hinges 210 and 214, respectively.

At step 306, the panel 102 is folded along hinges 212 and 216, such that the edge of board 206 distal to the board 204 meets the edge of board 204 distal to the board 206. As a result, the board 208, which is underneath board 206 at step 304, is flipped such that the back of board 208 is shown. In this configuration in step 306, the back of board 202 is in contact with the surface on which the panel 102 is laid, and the back of board 208 is the furthest from the surface, facing away from the surface. This configuration therefore results in a two feet by two feet shape that may be more easily transported or stored. The tab 220 may be configured to be grasped and moved towards the distal edge of board 204 in order to rotate boards 206 and 208 about hinges 212 and 216.

As further shown in flow 300B of FIG. 3, the panel 102 may be unfolded by reversing the steps in flow 300A. At block 312, the panel is in the folded position described in step 306, with the back of board 202 in contact with the surface and the back of board 208 stacked opposite board 202 and facing away from the surface. The tab 220 may be rotated about hinges 212 and 216, flipping board 208 towards the surface. At block 314, the backs of boards 202 and 208 are in contact with the surface with the backs of boards 204 and 206 stacked opposite them, respectively. Tab 218 may be rotated about hinges 210 and 214, flipping the backs of boards 204 and 206 towards the surface. At block 316, the panel is completely unfolded with the fronts of boards 202, 204, 206, and 208 shown and the backs of the boards in contact with the surface.

Figure 4:
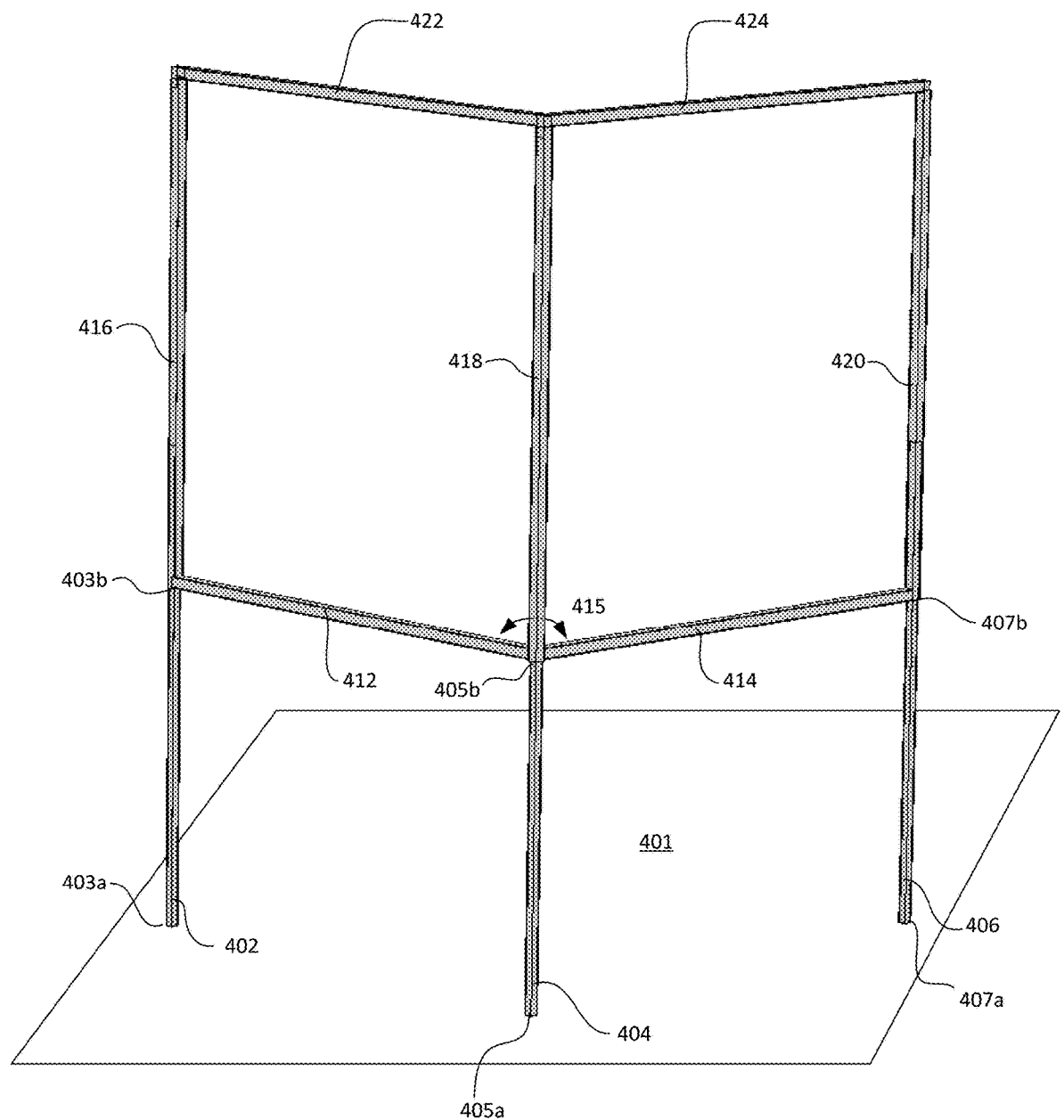
FIG. 4 is a perspective view of a frame assembly in accordance with aspects of the disclosure.
Figure 5:
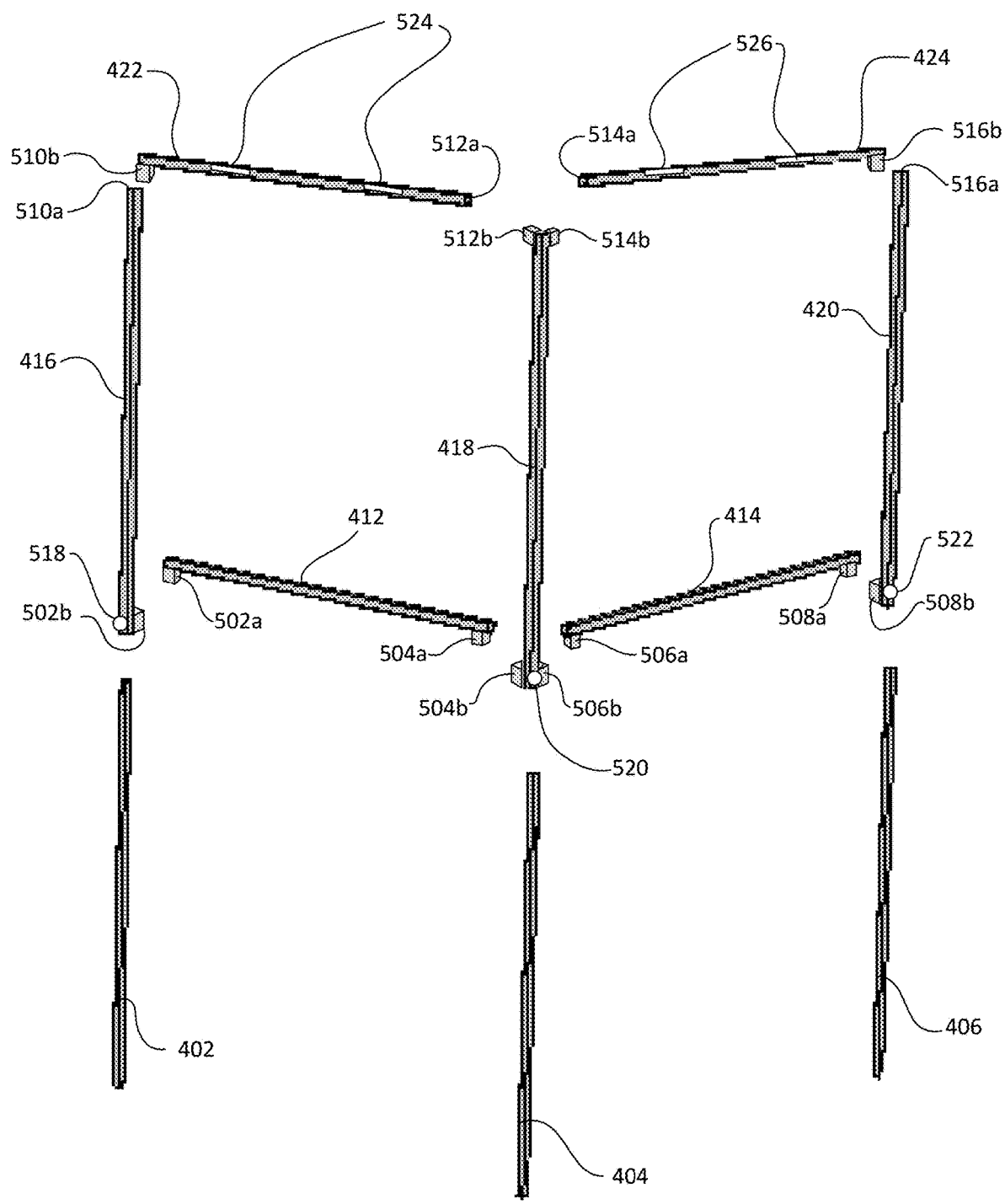
FIG. 5 is an exploded perspective view of the frame assembly in accordance with aspects of the disclosure.

The frame assembly 106 may include a plurality of legs and a plurality of frame edges. For example, as shown in FIGS. 4 and 5, frame assembly 106 includes legs 402, 404, and 406 and frame edges 412, 414, 416, 418, 420, 422, and 424. Each of the legs and each of the frame edges may be a straight length of square tubing formed of a lightweight material, such as aluminum. Another type of metal, polymer, or other material may be used in place of aluminum. Each of the frame edges may have a same length, and each of the legs may have a same length that is the same or shorter than the frame edges. In addition, the length of the legs may be the same or longer than the pre-selected height. For example, frame edges 412, 414, 416, 418, 420, 422, and 424 may be 4 feet long, and the legs 402, 404, and 406 may be 4 feet long or less. Each of the frame edges may have a square cross-section on the order of one square inch, and each of the legs may have the same square cross-section or may be smaller in area.

As depicted in FIG. 4, a frame assembly 106 includes legs 402, 404, and 406 that each contacts the ground 401 or other surface at a first end 403a, 405a, or 407a, respectively, and a frame edge at a second end 403b, 405b, or 407b, respectively. In addition, legs 402, 404, and 406 are positioned at least approximately parallel to one another. In this example, leg 402 is positioned at or approximately four feet from leg 404, and leg 404 is also positioned at or approximately four feet from leg 406.

Extending between the second ends 403b and 405b of legs 402 and 404, respectively, is frame edge 412, and extending between the second ends 405b and 407b of legs 404 and 406, respectively, is frame edge 414. Frame edge 412 is therefore at least approximately perpendicular to legs 402 and 404, and frame edge 414 is at least approximately perpendicular to legs 404 and 406. Both frame edges 412 and 414 are also at least approximately parallel to the ground. In addition, frame edges 412 and 414 form a right angle 415, or a 90 degree angle, or more or less, such that frame assembly 106 may be freestanding.

Frame edges 416, 418, and 420 contact legs 402, 404, and 406, respectively, at a first end and extend away from the ground, either coaxially or parallel to each respective leg. In this way, frame edges 416, 418, and 420 are positioned at least approximately parallel to one another, and frame edge 418 is positioned at or approximately four feet from frame edges 416 and 420. Frame edge 416 is also at least approximately perpendicular to frame edge 412, frame edge 418 at least approximately perpendicular to frame edges 414 and 414, and frame edge 420 at least approximately perpendicular to frame edge 414.

Between a second end of frame edge 416 and a second end of frame edge 418 extends frame edge 422, and between the second end of frame edge 418 and a second end of frame edge 420 extends frame edge 424. Frame edge 420 is therefore at least approximately perpendicular to frame edges 416 and 418, and frame edge 424 is at least approximately perpendicular to frame edges 418, and 420. Both frame edges 422 and 424 are also at least approximately parallel to frame edges 412 and 414 and the ground.

In one implementation, the plurality of legs and the plurality of frame edges are separable from one another, and may be assembled to one another using one or more connections to form the frame assembly 106. The one or more connections may be one or more joint assemblies. Each joint assembly of the one or more joint assemblies may include a first joint portion and a second joint portion. The first joint portion may be configured to fit within the second joint portion. For example, as shown in FIG. 5, joint portions may be protrusions from frame edges. As also shown in FIG. 5, frame edges 412 and 416 may be configured to be assembled by joining joint portion 502a of frame edge 412 and joint portion 502b of frame edge 416. Joint portion 502a may be positioned at one end of frame edge 412 and may be configured to fit within joint portion 502b, which is positioned at an end of frame edge 416. When fitted together, joint portions 502a and 502b form joint assembly 502. Frame edges 412 and 418 may be configured to be assembled by joining joint portion 504a of frame edge 412 and joint portion 504b of frame edge 418. Joint portion 504a may be positioned at a second end of frame edge 412 mirroring the end holding joint portion 502a, and may be configured to fit within joint portion 504b, which is positioned at an end of frame edge 418. When fitted together, joint portions 504a and 504b form joint assembly 504.

Similarly, frame edges 414 and 418 may be configured to be assembled by joining joint portion 506a of frame edge 414 and joint portion 506b of frame edge 418. Joint portion 506a may be positioned at one end of frame edge 414 and may be configured to fit within joint portion 506b, which is positioned at the same end of frame edge 416 as joint portion 504b. When fitted together, joint portions 506a and 506b form joint assembly 506. Frame edges 414 and 420 may be configured to be assembled by joining joint portion 508a of frame edge 414 and joint portion 508b of frame edge 420. Joint portion 508a may be positioned at a second end of frame edge 414 mirroring the end holding joint portion 506a, and may be configured to fit within joint portion 508b, which is positioned at an end of frame edge 420. When fitted together, joint portions 508a and 508b form joint assembly 508.

For joint assemblies 510, 512, and 516, a free end of a frame edge is the first joint portion configured to fit within a protruding second joint portion of another frame edge. For instance, joint assembly 510 is formed by inserting free end 510a of frame edge 416, which is distal from joint portion 502b of frame edge 416, into joint portion 510b of frame edge 422. Joint assembly 512 is formed by inserting free end 512a of frame edge 422, which is distal from joint portion 510b, into joint portion 512b of frame edge 418. Joint portion 512b is positioned at a second end of frame edge 418 distal from the end holding joint portions 504b and 506b. Similarly, joint assembly 514 is formed by inserting free end 514a of frame edge 424 into joint portion 514b of frame edge 418, which is at the same end of frame edge 418 as joint portion 512b. Joint assembly 516 is formed by inserting free end 516a of frame edge 420, which is distal from joint portion 508b of frame edge 420, into joint portion 516b of frame edge 424. Joint portion 516b is positioned at a second end of frame edge 424 distal from the free end 514a.

The one or more connections may also include an adjustable stop configured to hold a leg of the frame assembly 106 at a location inside one of the frame edges. For example, leg 402 may be configured to fit within a cavity of frame edge 416, and an adjustable stop 518 on frame edge 416, such as a screw, may be tightened or closed to hold the leg 402 partially within the cavity of frame edge 416 and extending out of the cavity away from free end 510a. In a same or similar way, leg 404 may be configured to fit and be held within frame edge 418 using an adjustable stop 520 extending away from joint portions 512b and 514b, and leg 406 may be configured to fit and be held within frame edge 420 using an adjustable stop 522 extending away from free end 516a. The length or height of a given leg may be adjusted by loosening or opening the adjustable stop, sliding the given leg further into or out of the cavity of the frame edge, and retightening or reclosing the adjustable stop. In other examples, the plurality of legs 402, 404, and 406 are assembled to frame edges 416, 418, and 420, respectively, using joint assemblies as described above.

Additionally or alternatively, the one or more connections may include, for example, screws, nuts and bolts, magnets, clamps, clips, ties, temporary adhesives, or any combination of these.

In another implementation, at least a portion of the frame assembly may be connected by collapsible hinges. In other words, at least a subset of legs and/or frame edges of the frame assembly may be connected via collapsible hinges. A second subset of legs and/or frame edges may optionally be assembled to the subset of legs and/or frame edges using one or more of the joint assemblies described above. In a collapsed position, the collapsible hinges may be completely folded such that the subset legs and/or frame edges may be bundled closer together in near parallel positions. In an open position, the collapsible hinges may be opened to 90 degree or 180 degree positions, and the subset of legs and/or frame edges may be positioned to form the portion of the frame assembly.

The frame assembly also optionally includes one or more support bars connecting two of the plurality of frame edges. The one or more support bars may be formed of the same material as the frame edges, and may have one or more attachment means to connect to the two frame edges. For example, a support bar may connect frame edges 412 and 414, frame edges 416 and 420, or frame edges 422 and 424. The support bar may provide structural support to the frame assembly to allow the frame assembly to better stand or better hold its shape.

The frame assembly may also include a second attachment means configured to removably attach to the first attachment means of the one or more panels. For example, frame edge 422 or 424 may include a fastener portion 524 or 526 that corresponds with the fastener portion 209 of the board 202 and/or board 204 of panel 102, such as a hook and loop fastener. Other examples of corresponding fastener portions include a magnet, a snap, a hook, an aperture, or any other known fastener portion configured to removably receive to another fastener portion. Alternatively, frame edge 422 may include a screw, peg, or other feature configured to receive an aperture in board 202 and/or board 204. Frame edge 424 may be similarly configured as frame edge 422 to receive same or similar attachment means on the boards of panel 104.

Figure 6:
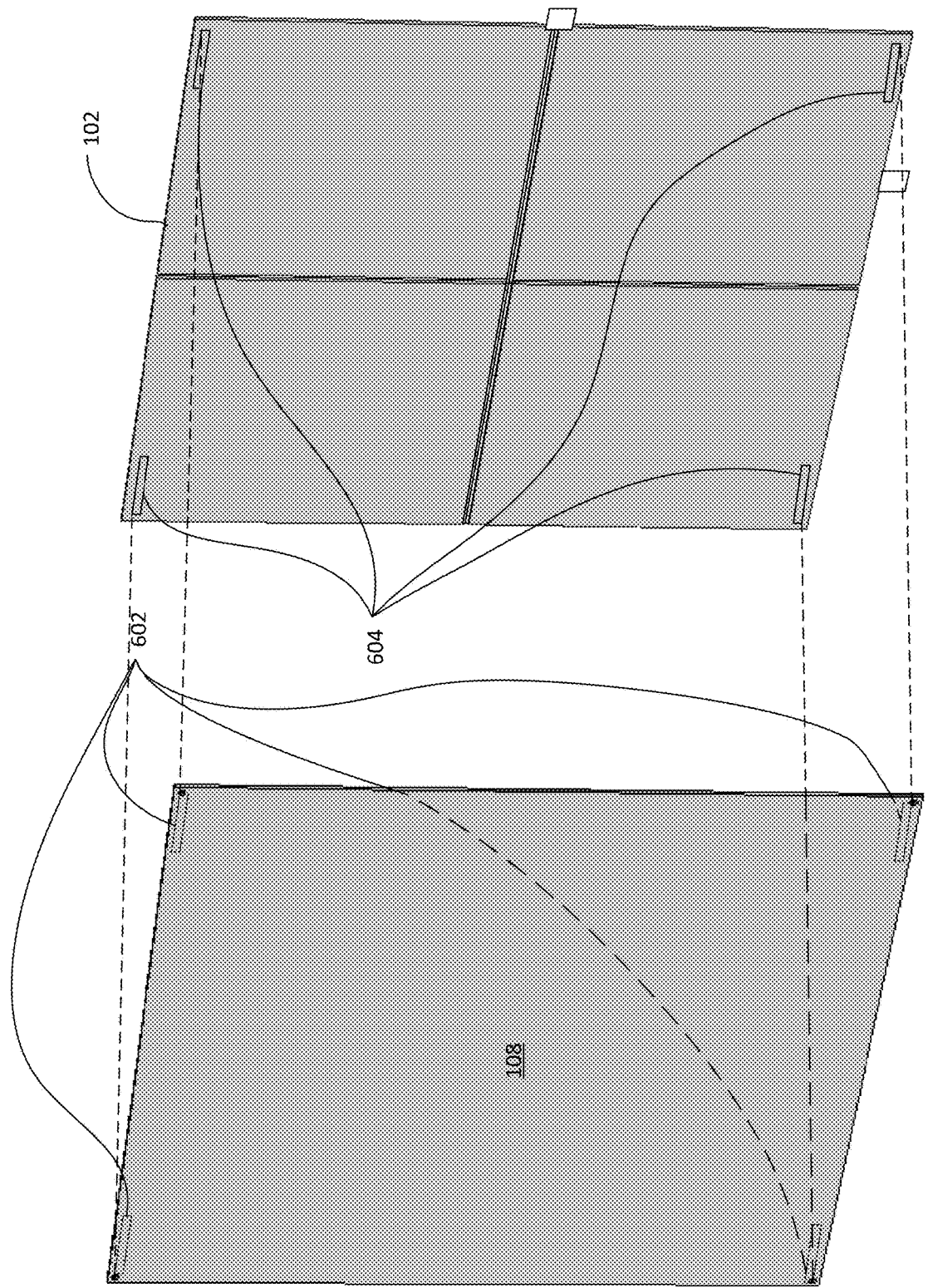
FIG. 6 is a perspective view of an intensity calibration fabric in accordance with aspects of the disclosure.

The intensity calibration fabric 108, shown in FIG. 6, may be a separate piece of material configured to attach to one of the panels or the frame assembly. When completely flat, the intensity calibration fabric 108 may be the same size as one of the panels, such as panel 102, which is four feet by four feet. The material of the intensity calibration fabric 108, for example, polyester, may have a reflective coating on at least one side of the material. The intensity calibration fabric 108 may therefore be deformable, such as by rolling or folding, which may allow for easier transportation or storage of the fabric.

The intensity calibration fabric 108 may also include a third attachment means 602, same or similar to the first attachment means discussed above with respect to the plurality of boards. For example, the intensity calibration fabric 108 may include a fastener portion, such as a hook and loop fastener or a snap at each corner of the fabric. As shown in FIG. 6, the fastener portion may be positioned at the back of the intensity calibration fabric 108. The third attachment means may be configured to attach to a fourth attachment means 604, same or similar to the second attachment means discussed above with respect to frame assembly 106. For example, the fourth attachment means 604 may be a corresponding fastener portion, such as another hook and loop fastener or snap that is positioned at each corner of the front surface of panel 102, as shown in FIG. 6, or alternatively on frame edges 412, 416, 418, and/or 422.

Figure 7:
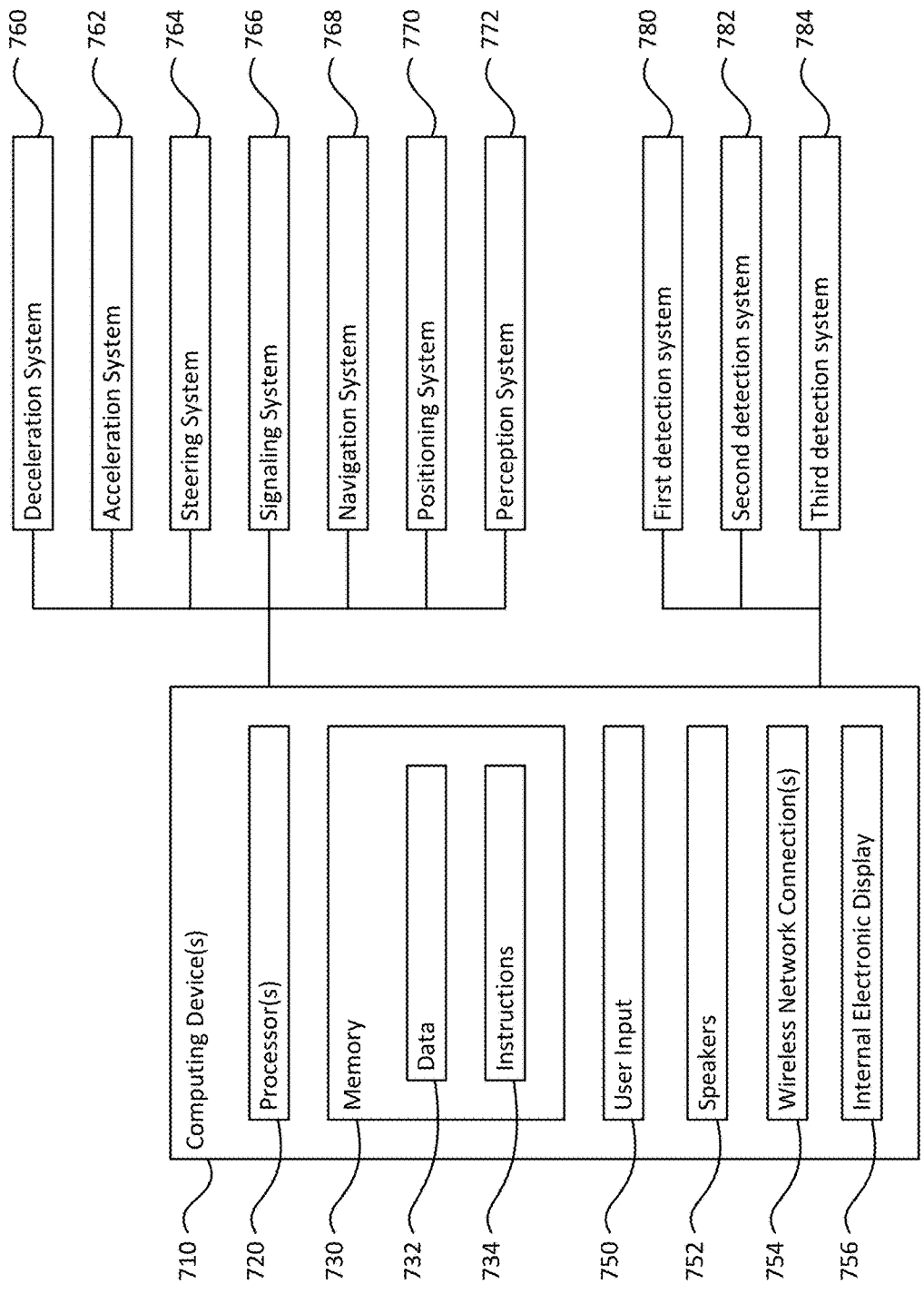
FIG. 7 is a functional block diagram of a vehicle in accordance with aspects of the disclosure.

The portable sensor calibration target 100 may be used to calibrate a first, second, and/or third detection system of a vehicle 700. As shown in FIG. 7, a vehicle 700 in accordance with one aspect of the disclosure includes various components. While certain aspects of the disclosure are particularly useful in connection with specific types of vehicles, the vehicle 700 may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle 700 may have one or more computing devices 710 that include one or more processors 720, memory 730 and other components typically present in general purpose computing devices.

The memory 730 stores information accessible by the one or more processors 720, including data 732 and instructions 734 that may be executed or otherwise used by the processor (s) 720. The memory 730 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 732 may be retrieved, stored or modified by processor(s) 720 in accordance with the instructions 732. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 734 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 720 may be any conventional processors, such as commercially available CPUs. Alternatively, the one or more processors may be a dedicated device such as an ASIC or other hardware-based processor, such as a field programmable gate array (FPGA). Although FIG. 7 functionally illustrates the processor(s), memory, and other elements of the vehicle's computing devices 710 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of the vehicle's computing devices 710. Accordingly, references to a processor or computing device will be understood to include references to a collection of processors or computing devices or memories that may or may not operate in parallel.

The vehicle's computing devices 710 may have all of the components normally used in connection with a computing device such as the processor and memory described above, as well as a user input 750 (e.g., a mouse, keyboard, touch screen and/or microphone), various electronic displays (e.g., a monitor having a screen, a small LCD touch-screen or any other electrical device that is operable to display information), audio output (such as speakers 752), and a wireless network connection 754. In this example, the vehicle 700 includes an internal electronic display 756. In this regard, internal electronic display 756 may be located within a cabin of vehicle 700 and may be used by the vehicle's computing devices 710 to provide information to passengers within the vehicle 700.

In one example, the vehicle's computing devices 710 may be an autonomous driving computing system incorporated into vehicle 700. The autonomous driving computing system may capable of communicating with various components of the vehicle 700 as needed in order to control the vehicle 700 in fully autonomous (without input from a driver) as well as semi-autonomous (some input from a driver) driving modes.

When engaged, the vehicle's computing devices 710 may control some or all of these functions of vehicle 700 and thus be fully or partially autonomous. It will be understood that although various systems and the vehicle's computing devices 710 are shown within vehicle 700, these elements may be external to vehicle 700 or physically separated by large distances. In this regard, the vehicle's computing devices 710 may be in communication various systems of vehicle 700, such as deceleration system 760, acceleration system 762, steering system 764, signaling system 766, navigation system 768, positioning system 770, and perception system 772, such that one or more systems working together may control the movement, speed, direction, etc. of vehicle 700 in accordance with the instructions 734 stored in memory 730. Although these systems are shown as external to the vehicle's computing devices 710, in actuality, these systems may also be incorporated into the vehicle's computing devices 710, again as an autonomous driving computing system for controlling vehicle 700.

As an example, the vehicle's computing devices 710 may interact with deceleration system 760 and acceleration system 762 in order to control the speed of the vehicle 700. Similarly, steering system 764 may be used by the vehicle's computing devices 710 in order to control the direction of vehicle 700. For example, if vehicle 700 configured for use on a road, such as a car or truck, the steering system may include components to control the angle of wheels to turn the vehicle 700. Signaling system 766 may be used by the vehicle's computing devices 710 in order to signal the vehicle's intent to other drivers or vehicles, for example, by lighting turn signals or brake lights when needed.

Navigation system 768 may be used by the vehicle's computing devices 710 in order to determine and follow a route to a location. In this regard, the navigation system 768 and/or data 732 may store map information, e.g., highly detailed maps identifying the shape and elevation of roads, lane lines, intersections, crosswalks, speed limits, traffic signals, buildings, signs, real time traffic information, vegetation, or other such objects and information. Map information may also include information that describes the location of speed limit signs as well as speed limits for sections of road or zones.

Positioning system 770 may be used by the vehicle's computing devices 710 in order to determine the vehicle's relative or absolute position on a map or on the earth. For example, the positioning system 770 may include a GPS receiver to determine the device's latitude, longitude and/or altitude position. Other location systems such as laser-based localization systems, inertial-aided GPS, or camera-based localization may also be used to identify the location of the vehicle 700. The location of the vehicle may include an absolute geographical location, such as latitude, longitude, and altitude as well as relative location information, such as location relative to other cars immediately around it which can often be determined with less noise that absolute geographical location.

The positioning system 770 may also include other devices in communication with the vehicle's computing devices 710, such as an accelerometer, gyroscope or another direction/speed detection device to determine the direction and speed of the vehicle 700 or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the vehicle's computing devices 710, other computing devices and combinations of the foregoing.

The perception system 772 may include one or more components for detecting and performing analysis on objects external to the vehicle 700 such as other vehicles, obstacles in the road, traffic signals, signs, trees, etc. For example, the perception system 772 may include a plurality of detection systems, such as, for example, lasers, sonar units, radar units, cameras, or any other detection devices which record data which may be processed by the vehicle's computing devices 710. This data may describe the shape and geographic location coordinates of objects detected in the vehicle's environment.

Figure 8:
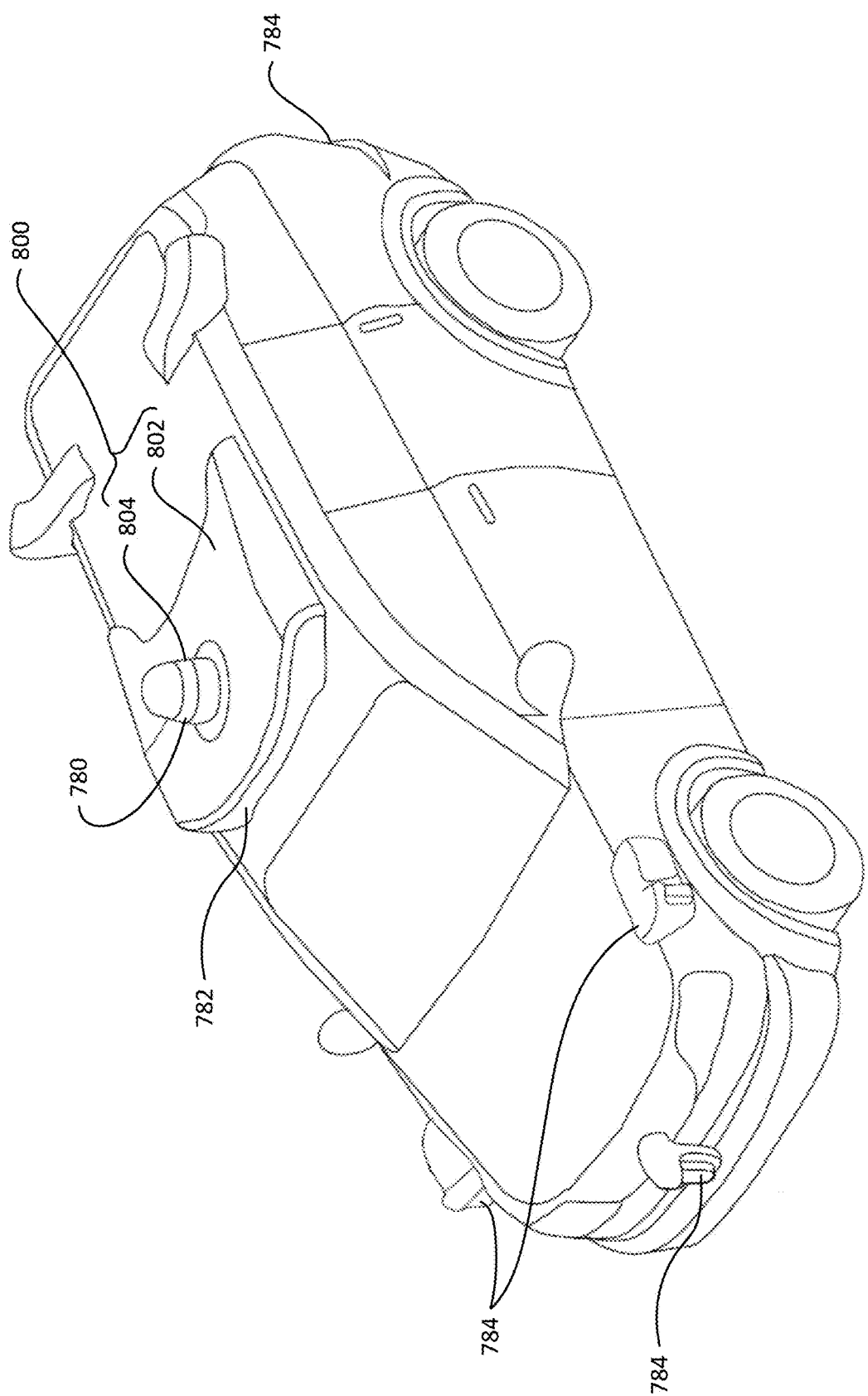
FIG. 8 is a pictorial diagram of the vehicle in accordance with aspects of the disclosure.

The plurality of detection systems in the vehicle 700 may include a first detection system 780, a second detection system 782, and a third detection system 784. Each detection system may be positioned on or in different portions of the vehicle 700 and may be configured to detect objects in the vehicle's environment using different types of sensors. As shown in FIG. 8, the vehicle 700 may include a positioning box 800 mounted atop a roof of the vehicle 700 or in a different part of the vehicle 700. When mounted atop the roof of the vehicle 700, the positioning box 800 may include a dome that comprises a lower dome portion 802 and an upper dome portion 804 that are both configured to house one or more of the detection systems. For instance, the first detection system 780 may be mounted at least partially within the upper dome portion 804 atop the lower dome portion 802. The second detection system 782 may be located at least partially within the lower dome portion 802 atop the roof of the vehicle 700. The third detection system 784 may include one or more sensors mounted on side mirrors, front bumper, rear bumper, or other locations on the vehicle 700 below or lower than the roof of the vehicle 700. Different arrangements of the detection systems may be utilized in other implementations.

The first detection system 780 may include one or more lidar systems configured to detect objects within a wide angle view and within a first range of distances from the vehicle 700. In one example, the first detection system 780 may comprise 64 lidar systems and may be configured to send an electromagnetic signal out in a ring pattern. The wide angle view in this example is the 360-degree area around the vehicle 700, and the set first range is between about 20 meters and about 80 meters from the vehicle 700.

The second detection system 782 may be one or more lidar systems configured to detect objects within a narrow angle view and within a set second range of distances from the vehicle 700. The narrow angle view is smaller than the wide angle view, and the set second range reaches a farther distance than the set first range. For example, the set second range may be between about 60 meters and at least 125 meters, such as more than 200 meters, from the vehicle 700. The narrow angle view in this example may be within a 60-degree angle. The second detection system 782 may be steerable by rotating up to 360 degrees about an axis.

The third detection system 784 may include one or more lidar systems configured to detect objects in areas where the first detection system 780 and the second detection system 782 are less likely to reach, or blind spots. For example, objects below a particular height and within a particular distance from the vehicle 700 may be less likely to be detected by the first detection system 780 or the second detection system 782 that are positioned on top of the vehicle 700. The one or more lidar sensors of the third detection system 784 may be positioned lower than the first or second detection systems to better detect objects that may be in the blind spots of the first or second detection systems. In the example in FIG. 8, the one or more lidar sensors may be at a front bumper, a rear bumper, and along each side of the vehicle 700. The one or more lidar systems may additionally be angled towards the ground. The third detection system 784 may therefore detect objects within a set third range of distances from the vehicle 700 that reaches a shorter distance than the set first range. For example, the set third range may be between about 0 meters and about 60 meters from the vehicle 700.

Of course, in some examples, the plurality of detection systems includes additional detection systems that may include radar, cameras, microphones, or other types of sensors. For example, one or more radar systems may be positioned at each corner of the vehicle 700. One or more cameras may be mounted atop the vehicle 700, such as in the upper dome portion 804. Microphones or other types of sensors may be mounted atop the vehicle as well, such as in the lower dome portion 802.

Example Methods

Figure 9:
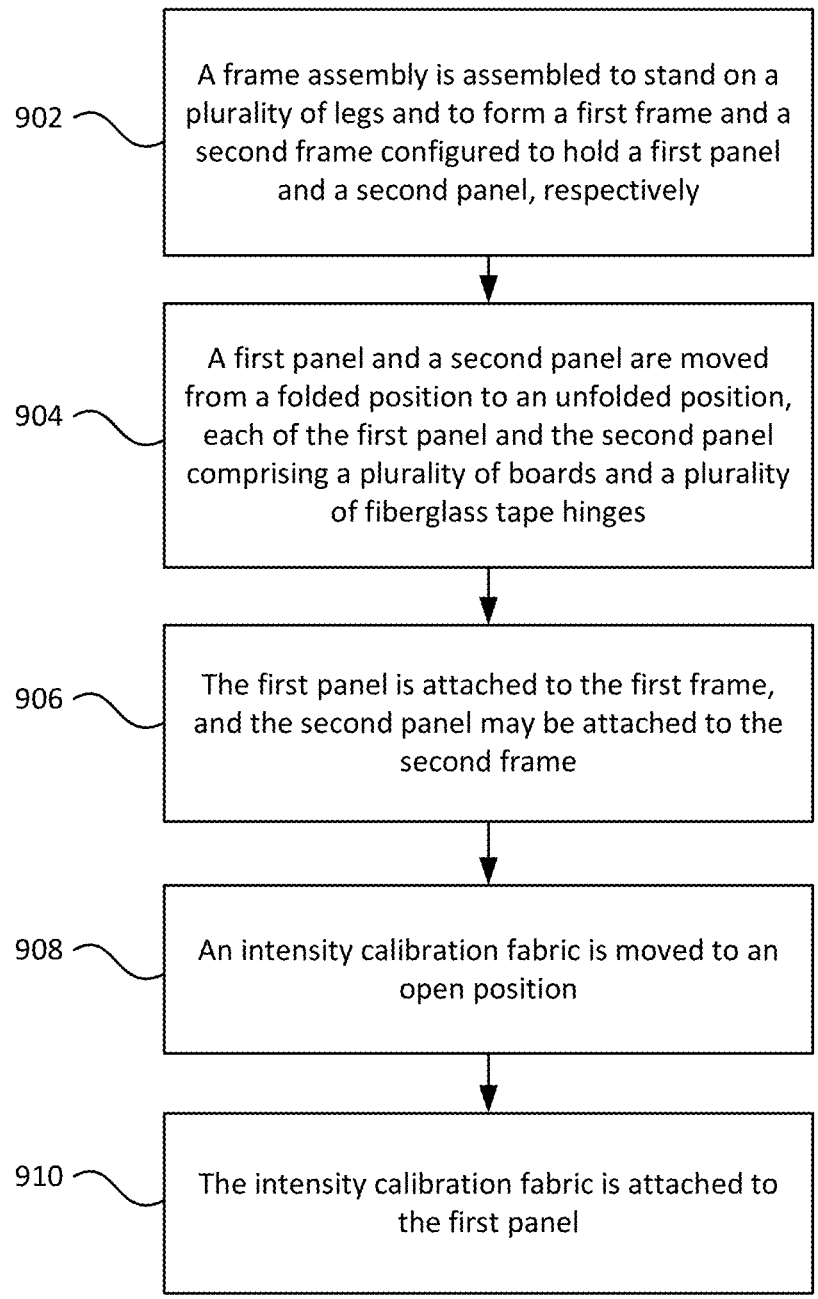
FIG. 9 is a flow diagram for a method of assembling the sensor calibration target in accordance with aspects of the disclosure.

FIG. 9 shows a flow diagram 900 depicting a method of assembling the portable sensor calibration target according to aspects of the disclosure. While FIG. 9 shows blocks in a particular order, the order may be varied and that multiple operations may be performed simultaneously. Also, operations may be added or omitted.

At block 902, a frame assembly 106 may be assembled to stand on a plurality of legs and to form a first frame and a second frame configured to hold a first panel and a second panel, respectively. The frame assembly 106 includes the plurality of legs 402, 404, and 406 and a plurality of frame edges 412, 414, 416, 418, 420, 422, and 424. The first frame is formed by frame edges 412, 416, 418, and 422, and the second frame is formed by frame edges 414, 418, 420, and 424. The first frame and the second frame may be square or rectangular.

In particular, the frame assembly 106 may be assembled by connecting joint portions 504a and 506a of frame edges 412 and 414, respectively, to joint portions 504b and 506b of frame edge 418 so that the frame edges 414 and 414 are approximately perpendicular to frame edge 418 and to one another. Then, joint portion 502a of frame edge 412 may be connected to joint portion 502b of frame edge 416, and joint portion 508a of frame edge 414 may be connected to joint portion 508b of frame edge 420. Following this, frame edge 422 may be connected by inserting free end 510a of frame edge 416 into joint portion 510b of frame edge 422 and inserting free end 512a of frame edge 422 into joint portion 512b of frame edge 418. Frame edge 424 may also be connected by inserting free end 514a of frame edge 424 into joint portion 514b of frame edge 418 and inserting free end 516a of frame edge 420 into joint portion 516b of frame edge 424. Then, legs 402, 404, and 406 may be connected to frame edges 416, 418, 420, respectively, using adjustable stops 518, 520, 522, respectively.

At block 904, a first panel 102 and a second panel 104 may be moved from a folded position to an unfolded position, each of the first panel and the second panel comprising a plurality of boards and a plurality of fiberglass tape hinges. The first and second panels may include four boards, such as boards 202, 204, 206, and 208, and four fiberglass tape hinges, such as hinges 210, 212, 214, and 216. The boards 202, 204, 206, and 208 may be square and may be attached to one another in a two by two coplanar layout to form a larger square when the first or second panel is in the unfolded position. The hinges 210, 212, 214, and 216 may be arranged between the boards 202 and 204, boards 204 and 206, boards 206 and 208, and boards 208 and 202, respectively, such that the first or second panel may be folded in half twice. In the folded position of the first or second panel, the boards are not coplanar, but rather are stacked in the order of board 202, board 204, board 206, and board 208. To move the first panel 102 and the second panel 104 from the folded position to the unfolded position includes rotating boards 206 and 208 about hinges 212 and 216, and then rotating boards 204 and 206 about hinges 210 and 214.

At block 906, the first panel 102 may be attached to the first frame, and the second panel 104 may be attached to the second frame. The first panel may be attached to the first frame by connecting a first fastener portion of the first panel to a corresponding second fastener portion of the first frame. The second panel may be attached to the second frame by connecting a third fastener portion of the second panel to a corresponding fourth fastener portion of the second frame. For example, the first, second, third, and fourth fasteners may be hook and loop fasteners.

Optionally, at block 908, an intensity calibration fabric 108 may be moved to an open position, then, at block 910, be attached to the first panel 102. In the open position, the intensity calibration fabric may be flat and may have a same shape as the face of the first panel. For example, the intensity calibration fabric may be square or rectangular and have the same length and width as the first panel. The intensity calibration fabric may start in a rolled position and may be unrolled to the open position. Once in the open position, the intensity calibration fabric may be attached to the first panel by connecting a fifth fastener of the intensity calibration fabric with a sixth fastener of the first panel. The fifth and sixth fasteners may also be hook and loop fasteners. Alternatively, the intensity calibration fabric may be attached to the frame assembly, in which case the sixth fastener is on the frame assembly.

The method of disassembling the portable sensor calibration target may be the reverse of assembling described above. The intensity calibration fabric is detached and moved to a rolled position. Then the first and second panels are detached from the first and second frames of the frame assembly. The first and second panels are then moved from the unfolded position to the folded position. Then the frame assembly is disassembled by separating all the plurality of legs and frame edges.

Once assembled, the portable sensor calibration target 100 may be used to calibrate one or more detection systems of vehicle 700. The portable sensor calibration target 100 may be placed in within range of at least one of the one or more detection systems of vehicle 700. The vehicle 700 may be moved relative to the portable sensor calibration target 100 to perform the calibration.

The plurality of detection systems 780, 782, 784 may be calibrated in turn such that the coordinate frames of each detection system are calibrated to match that of the vehicle 700 and of each of the other detection systems. The calibration may be performed prior to the vehicle's hours of operation for a given day, or "shift," periodically, or as needed to address calibration errors or issues. After the calibration, locations of detected objects may be more accurately determined with respect the vehicle 700. Each detection system may be calibrated in a particular order, as described below. In some cases, the order of calibration may be different.

Figure 10:
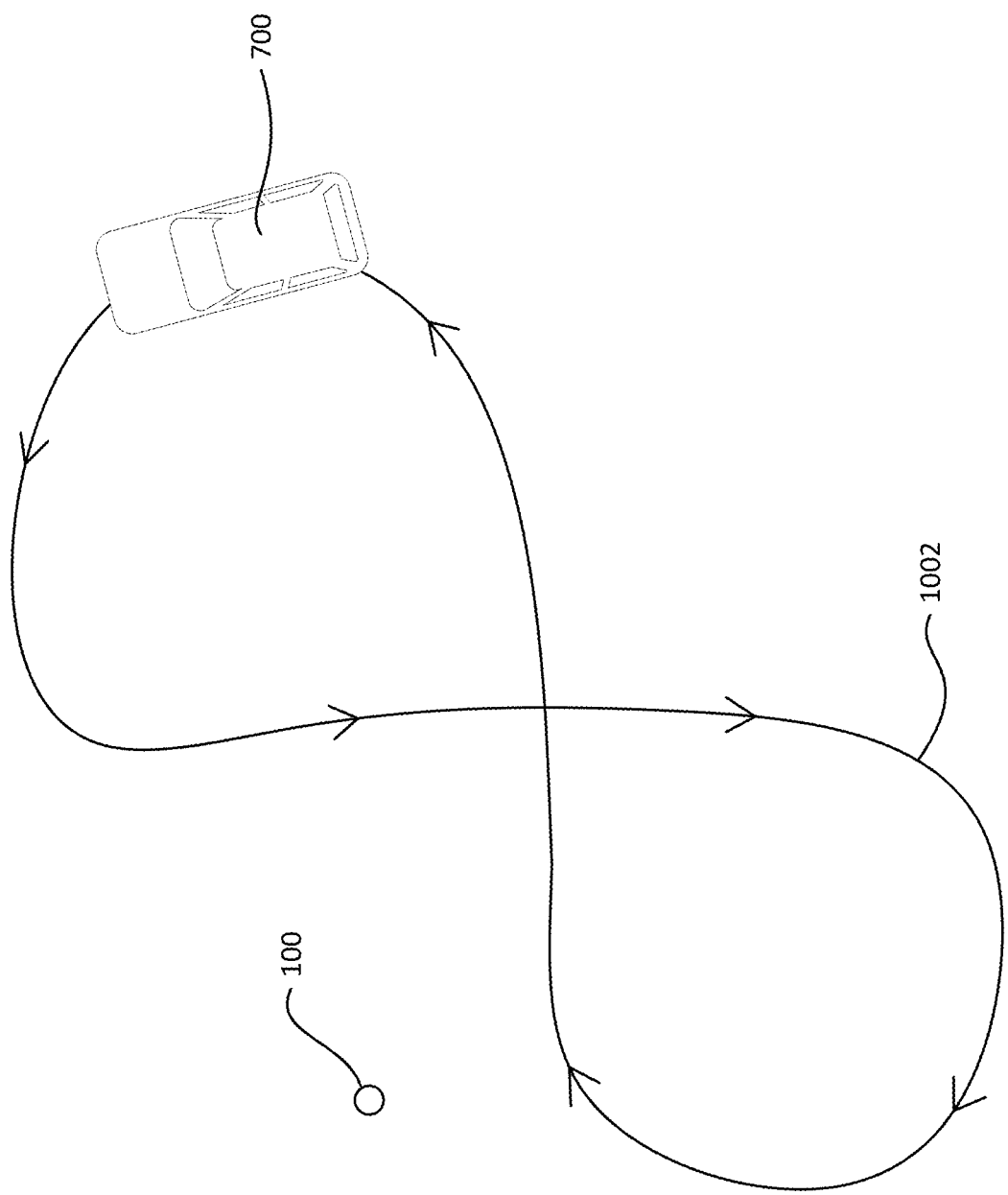
FIG. 10 is a pictorial diagram of a calibration method in accordance with aspects of the disclosure.

For example, the first detection system 780 may be calibrated by moving the vehicle 700 in relation to the portable sensor calibration target 100 as shown in FIG. 10. In one example, in order to perform the calibration, the vehicle 700 may be driven in a repeatable pattern, such as a circle or figure eight 1002, in the vicinity of the portable sensor calibration target 100.

As the vehicle 700 is driven in the pattern, a plurality of data points may be collected by the first detection system 780, and the vehicle's computing devices 710 may plot the data points onto a 3D model. Data points that are part of a moving object may be identified and filtered out by the vehicle's computing devices 710. Data points that are from small movements of the portable sensor calibration target 100 may also be identified and filtered out. The data points corresponding to the portable sensor calibration target 100 may be identified and processed to determine an amount of bias. The amount of bias may be determined by averaging the data points of the portable sensor calibration target to calculate an actual location of the portable sensor calibration target and subtracting the calculated actual location from the data points of the portable sensor calibration target. When the actual location of the portable sensor calibration target 100 is known, the known actual location may be used rather than the calculated actual location. For example, the known actual location may be identified using coordinates such as longitude/latitude, map location, or other coordinate system.

A correction to the first detection system 780 may be determined in order to adjust zero values of the one or more lidar systems of the first detection system 780. In some examples, the correction may be a 3×3 transform matrix. The correction may be stored in the memory of the vehicle's computing devices 710 and used to operate the first detection system 780. In this way, the vehicle's computing devices 710 may detect locations of objects in the vehicle's environment using the calibrated first detection system 780 with more accuracy in relation to the vehicle 700. The vehicle 700 may be operated autonomously with the more accurately detected locations of objects.

Figure 11B:
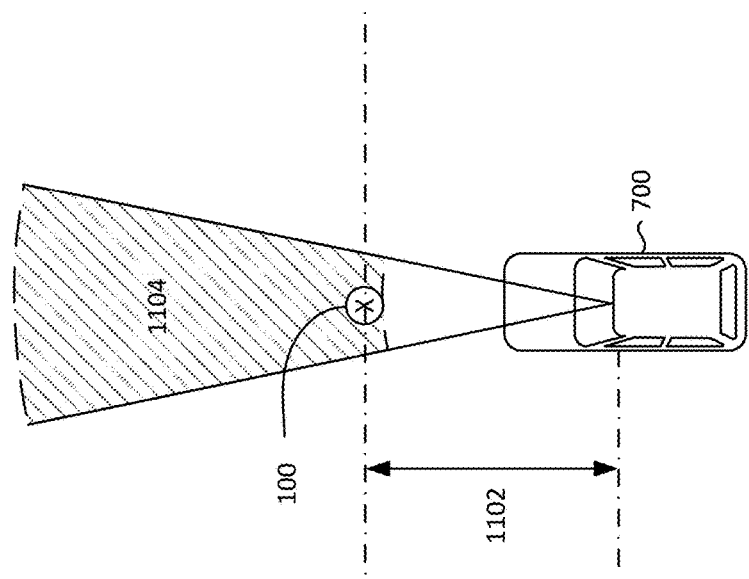
FIGS. 11A and 11B are pictorial diagrams illustrating another calibration method in accordance with aspects of the disclosure.
Figure 11A:
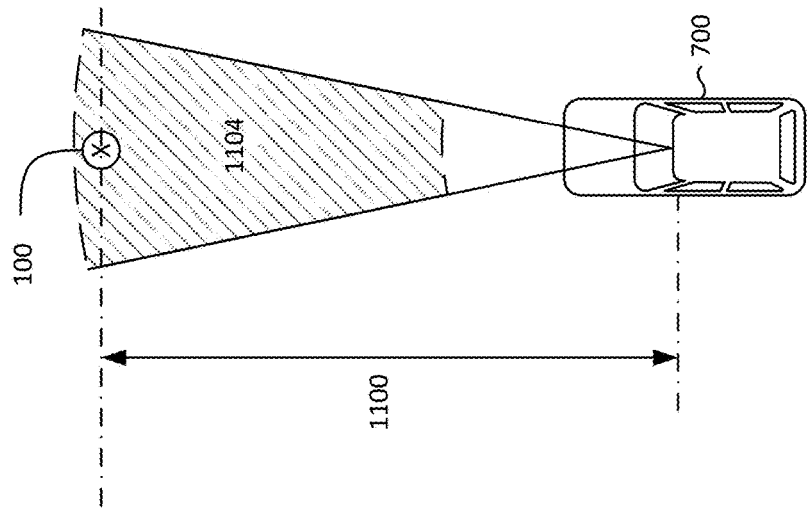

In addition or alternatively, the second detection system 782 may be calibrated by moving the second detection system 782 towards the intensity calibration fabric 108 assembled on panel 102 of the portable sensor calibration target 100 positioned at least a set start distance 1100 from the second detection system 782, as depicted in FIG. 11A. The vehicle 700 may be positioned directly facing the front of panel 102 of the portable sensor calibration target 100 and therefore directly face the intensity calibration fabric 108. Then, in one example, the vehicle 700 on which the second detection system 782 is mounted may be driven straight towards the portable sensor calibration target 100, starting from the set start distance 1100 until the vehicle 700 reaches a set end distance 1102, as depicted in FIG. 11B. The set start distance 1100 and the set end distance 1102 are both within the second range 1104 of the second detection system 782. Driving the vehicle 700 towards the portable sensor calibration target 100 moves the second detection system 782 towards the portable sensor calibration target 100. For instance, the set start distance 1100 may be at least 122 meters or more or less from the second detection system 782, and the set end distance 1102 may be at most 60 meters or more or less from the second detection system 782. The vehicle 700 may be driven slowly, for instance, at less than 5 miles per hour or more or less, towards the portable sensor calibration target 100.

As the vehicle 700 is driven towards the target, the second detection system 782 may collect intensity values at the second detection system caused by signal reflected off a point or an area within the intensity calibration fabric 108. The signal may be a light signal that is transmitted from the second detection system 782, such as a laser from lidar, and the reflection signal received at the second detection system 782 may be the light signal that is reflected off a portion of the intensity calibration fabric 108. The collected intensity values at each distance may be mapped by the vehicle's computing devices 710. The vehicle's computing devices 710 may determine a correction for the second detection system 782, such as gain adjustments at each distance that normalizes the collected intensity values to a single value. The gain adjustments may be stored in the memory of the vehicle's computing devices 710 and used to operate the second detection system 782. In this way, the vehicle's computing devices 710 may adjust for light decay that occurs in the far field of the second detection system 782.

Figure 12:
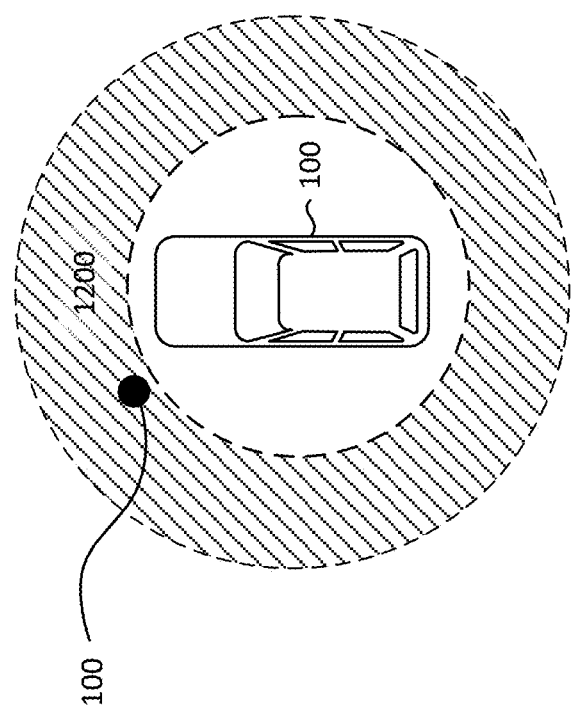
FIG. 12 is a pictorial diagram of a further calibration method in accordance with aspects of the disclosure.

The third detection system 784 may also be calibrated by detecting the edge formed by the two or more panels of the portable sensor calibration target 100. As shown in FIG. 12, the vehicle 700 may be positioned so that the portable sensor calibration target 100 is within the third range 1200 of the third detection system 784. For example, the vehicle 700 may be positioned at approximately 5 meters from the portable sensor calibration target 100. Using the third detection system 784, the vehicle's computing devices 710 may collect data points related to the edge 110 formed by panels 102 and 104 of the portable sensor calibration target 100. The vehicle's computing devices 710 may plot the data points onto a 3D model. The data points corresponding to the edge 110 may be processed to determine an amount of bias. The amount of bias may be determined by comparing the detected data points to an expected arrangement of data points for a vertical edge. Additionally or alternatively, the amount of bias may be determined by averaging the data points of the portable sensor calibration target to calculate an actual location of the portable sensor calibration target and subtracting the calculated actual location from the data points of the portable sensor calibration target.

A correction to the third detection system 784 may be determined in order to adjust zero values of the one or more lidar systems of the third detection system 784. In some examples, the correction may be a 3×3 transform matrix. The correction may be stored in the memory of the vehicle's computing devices 710 and used to operate the third detection system 784. In this way, the vehicle's computing devices 710 may detect locations of objects in the vehicle's environment using the calibrated third detection system 784 with more accuracy in relation to the vehicle 700. The vehicle 700 may be operated autonomously with the more accurately detected locations of objects.

After the plurality of detection systems are calibrated as described above, the vehicle's computing devices 710 may operate the vehicle 700 using the plurality of detection systems and the determined corrections associated with each detection system in the plurality of detection systems. Updated corrections may be determined at a later time and stored in the memory of the vehicle's computing devices 710.

In addition to the calibrations described above, the portable sensor calibration target 100 may be used to perform further extrinsic calibrations between the plurality of detection systems and/or the vehicle 700. For example, the vehicle 700 may be positioned such that the portable sensor calibration target 100 is in an overlap area of two detection systems. The overlap area of two detection systems may be where a set range of one detection system overlaps with a set range of another detection system. A correction may be determined in order to adjust zero values of one detection system so that data point locations of the portable sensor calibration target collected by the one detection system matches data point locations of the portable sensor calibration target collected by the other detection system. In some examples, the correction may be a 3×3 transform matrix. The correction may be stored in the memory of the vehicle's computing devices 710 and used to operate the one detection system. In this way, the vehicle's computing devices 710 may detect locations of objects in the vehicle's environment using the one detection system with more accuracy in relation to the vehicle 700.

Figure 13A:
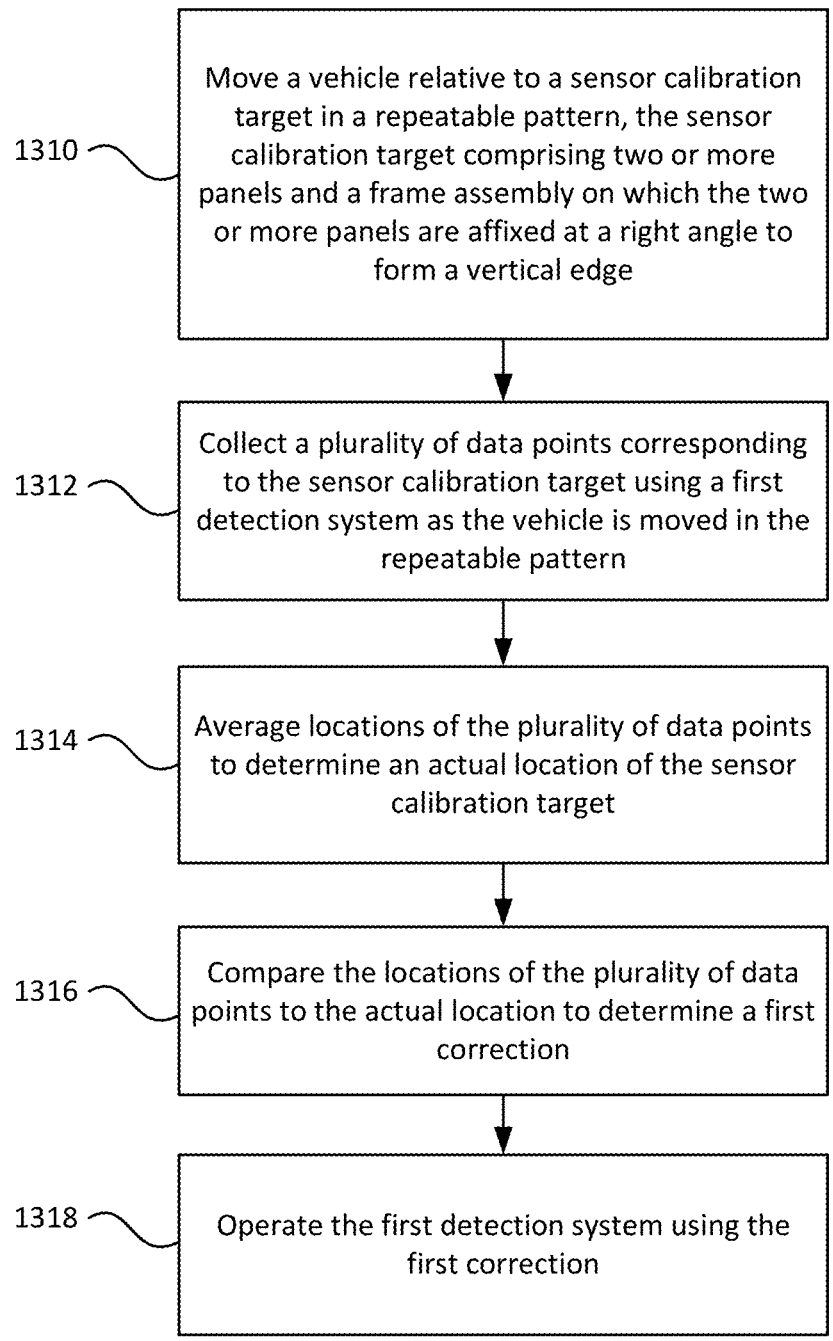
FIGS. 13A-13C are flow diagrams for methods of calibrating detection system in accordance with aspects of the disclosure.
Figure 13B:
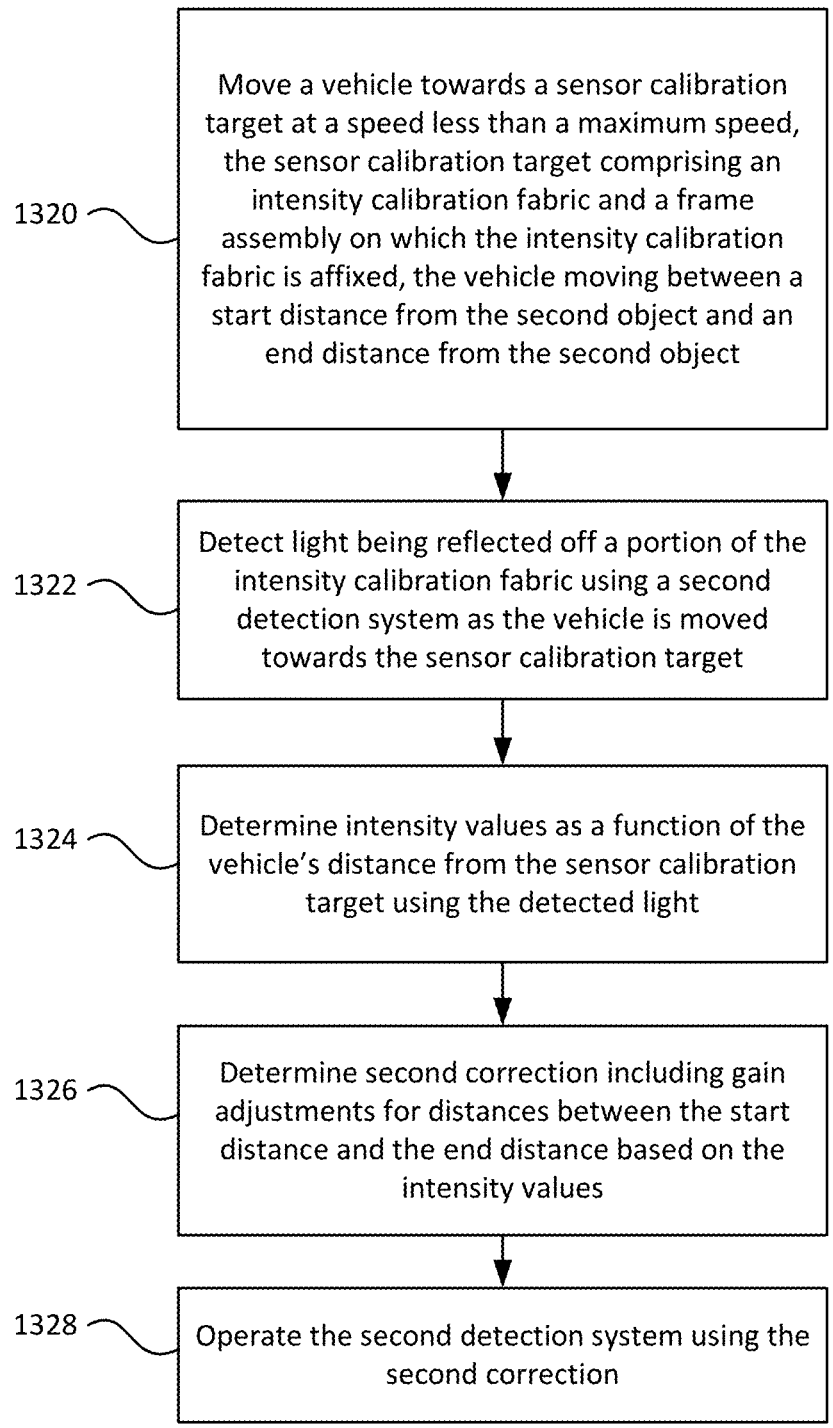
Figure 13C:
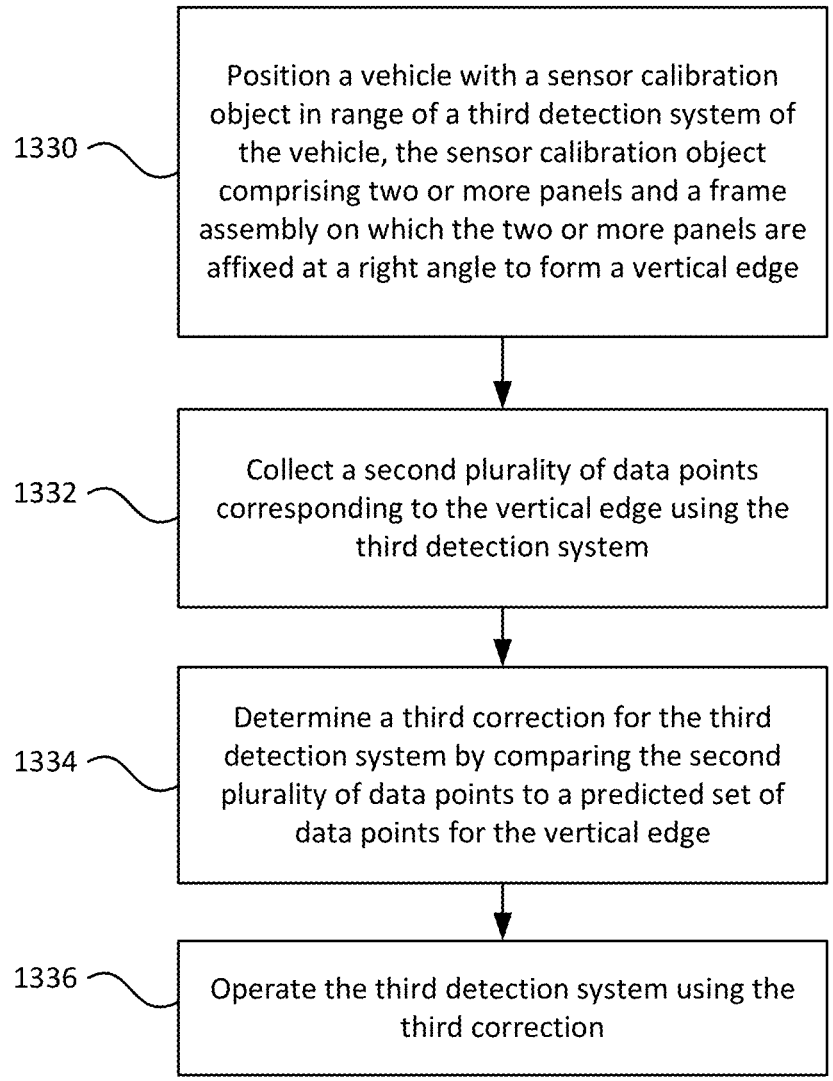

In FIGS. 13A-13C, flow diagrams 1300A-1300C depict methods of calibration according to some of the aspects described above. While FIGS. 13A-13C show blocks in a particular order, the order may be varied and that multiple operations may be performed simultaneously. Also, operations may be added or omitted.

The flow diagram 1300A shows the method of calibrating the first detection system 780. The method may be performed by the vehicle's computing devices 710. At block 1310, the vehicle 700 may be moved relative to the portable sensor calibration target 100 in a repeatable pattern. As described above, the portable sensor calibration target 100 includes two or more panels and a frame assembly on which the two or more panels are affixed at a right angle, or a 90 degree angle, or more or less, to form a vertical edge. At block 1312, the vehicle's computing devices 710 may collect a plurality of data points corresponding to the portable sensor calibration target 100 using the first detection system 780 as the vehicle is moved in the repeatable pattern. At block 1314, the vehicle's computing devices 710 may average the locations of the plurality of data points to determine an actual location of the portable sensor calibration target. At block 1316, the locations of the plurality of data points may be compared to the actual location in order to determine a first correction for the first detection system 780. At block 1318, the vehicle's computing devices 710 may begin to operate the first detection system 780 using the first correction.

The flow diagram 1300B shows the method of calibrating the second detection system 782. The method may be performed by the vehicle's computing devices 710. At block 1320, the vehicle 700 may be moved towards a sensor calibration target, such as the portable sensor calibration target 100, at a speed less than a maximum speed. This sensor calibration target, as with the portable sensor calibration target 100, includes an intensity calibration fabric and a frame assembly on which the intensity calibration fabric is affixed. The vehicle 700 may be moved from a start distance from the sensor calibration target to an end distance from the sensor calibration target. At block 1322, the vehicle's computing devices 710 may detect light being reflected off a portion of the intensity calibration fabric 108 using the second detection system 782 as the vehicle 700 is moved towards the sensor calibration target. At block 1324, the vehicle's computing devices 710 may determine intensity values as a function of the vehicle's distance from the sensor calibration target using the detected light. For example, a first intensity value may be determined for a first distance between the start distance and the end distance, and a second intensity value may be determined for a second distance between the start distance and the end distance, and so on. At block 1326, the vehicle's computing devices 710 may determine a second correction including gain adjustments for distances between the start distance and the end distance based on the intensity values. At block 1328, the vehicle's computing devices 710 may operate the second detection system 782 using the second correction.

The flow diagram 1300C shows the method of calibrating the third detection system 784. The method may be performed by the vehicle's computing devices 710. At block 1330, the vehicle 700 may be positioned with a sensor calibration target, such as the portable sensor calibration target 100, in range of the third detection system. This sensor calibration target, as with the portable sensor calibration target 100, includes two or more panels and a frame assembly on which the two or more panels are affixed at a right angle or a 90 degree angle, or more or less, to form a vertical edge. At block 1332, the vehicle's computing devices 710 may collect a second plurality of data points corresponding to the edge 110 of the sensor calibration target using the third detection system 784. At block 1334, the vehicle's computing devices 710 may compare the locations of the plurality of data points to predicted locations of data points corresponding to the edge 110 in order to determine a third correction for the third detection system 784. At block 1336, the vehicle's computing devices 710 may begin to operate the third detection system 784 using the third correction.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A detectable calibration target comprising:
   a frame assembly including:
      three legs, and
      a plurality of frame edges configured to form a first frame and a second frame adjacent to the first frame and configured to be held at a pre-selected height above ground by the three legs;
   a first panel removably attached to the first frame in an unfolded position, the first panel including:
      a plurality of boards, and
      a plurality of hinges connecting pairs of the plurality of boards,
      wherein the first panel is configured to fold at the plurality of hinges into a folded position when not attached to the first frame; and
   a second panel removably attached to the second frame adjacent to the first frame,
   wherein the first panel and the second panel meet to form an edge, the edge being detectable by a detection system of a vehicle for calibrating the detection system.

2. The detectable calibration target of claim 1, wherein the second panel is removably attached to the second frame in an unfolded position, and the second panel includes:
   a second plurality of boards, and
   a second plurality of hinges connecting pairs of the second plurality of boards,
   wherein the first panel is configured to fold at the second plurality of hinges into a folded position when not attached to the second panel.

3. The detectable calibration target of claim 1, wherein the three legs are configured to removably connect with the first frame and the second frame using adjustable stops on a subset of the plurality of frame edges.

4. The detectable calibration target of claim 1, wherein the folded position of the first panel is when the first panel folded in half twice from the unfolded position.

5. The detectable calibration target of claim 1, wherein the first panel is removably attached to the first frame using a hook and loop fastener.

6. The detectable calibration target of claim 1, wherein the first panel is four feet by four feet.

7. The detectable calibration target of claim 1, wherein the plurality of hinges are fiberglass tape hinges configured to limit or mitigate laser resolution interference.

8. The detectable calibration target of claim 1, wherein the first frame, the second frame, the first panel, and the second panel are each rectangular.

9. The detectable calibration target of claim 8, wherein each of the plurality of boards is rectangular.

10. The detectable calibration target of claim 1, wherein the plurality of frame edges also include joint portions, a first joint portion of a first frame edge of the plurality of frame edges being configured to removably connect with a second joint portion of a second frame edge of the plurality of frame edges.

11. The detectable calibration target of claim 10, wherein the first frame edge and the second frame edge form a right angle when the first joint portion and the second joint portion are connected.

12. The detectable calibration target of claim 1, further comprising an intensity calibration fabric removably attached to the first panel.

13. The detectable calibration target of claim 12, wherein the intensity calibration fabric is rectangular, having same dimensions as the first panel.

14. The detectable calibration target of claim 12, wherein the intensity calibration fabric is removably attached to the first panel using a hook and loop fastener.

15. A method comprising:
assembling a frame assembly of a detectable calibration target by removably connecting a plurality of frame edges to form a first frame and a second frame configured to stand on three legs at a pre-selected height;
moving a first panel of the detectable calibration target from a folded position to an unfolded position, the first panel comprising a plurality of board connected by a plurality of hinges, the plurality of boards being stacked in the folded position and unstacked in the unfolded position;
attaching the first panel to the first frame; and
attaching a second panel of the detectable calibration target to the second frame to meet and form an edge with the first panel, the edge being detectable by a detection system of a vehicle for calibrating the detection system.

16. The method of claim 15, wherein assembling the frame assembly includes connecting a first joint portion of a first frame edge of the plurality of frame edges to a second joint portion of a second frame edge of the plurality of frame edges.

17. The method of claim 15, wherein assembling the frame assembly includes connecting a given leg of the three legs to a given frame edge of the plurality of frame edges using an adjustable stop on the given frame edge.

18. The method of claim 15, wherein attaching the first panel to the first frame includes connecting a first fastener portion of the first panel to a corresponding second fastener portion of the first frame.

19. The method of claim 15, further comprising attaching an intensity calibration fabric to the first panel.

20. The method of claim 15, further comprising moving the second panel from a folded position to an unfolded position, the second panel comprising a second plurality of board connected by a second plurality of hinges, the second plurality of boards being stacked in the folded position and unstacked in the unfolded position.

* * * * *

UNITED STATES PATENT AND TRADEMARK OFFICE
CERTIFICATE OF CORRECTION

Page 1 of 1

PATENT NO. : 10,942,045 B1
APPLICATION NO. : 15/944087
DATED : March 9, 2021
INVENTOR(S) : Crawford et al.

It is certified that error appears in the above-identified patent and that said Letters Patent is hereby corrected as shown below:

In the Claims

Column 18, Lines 43-44:
Claim 4: "the first panel folded" should read -- the first panel is folded --

Signed and Sealed this
Twelfth Day of April, 2022

Drew Hirshfeld
*Performing the Functions and Duties of the
Under Secretary of Commerce for Intellectual Property and
Director of the United States Patent and Trademark Office*